(12) United States Patent
Tanner (10) Patent No.: US 8,844,948 B1
(45) Date of Patent: Sep. 30, 2014

(54) SHOPPING CART CRUTCH ASSEMBLY

(71) Applicant: George Tanner, Paramount, CA (US)

(72) Inventor: George Tanner, Paramount, CA (US)

( * ) Notice: Subject to any disclaimer, the term of this patent is extended or adjusted under 35 U.S.C. 154(b) by 0 days.

(21) Appl. No.: 14/053,975

(22) Filed: Oct. 15, 2013

Related U.S. Application Data

(60) Provisional application No. 61/836,786, filed on Jun. 19, 2013.

(51) Int. Cl.
| | |
|---|---|
| *B62D 39/00* | (2006.01) |
| *A61H 3/00* | (2006.01) |
| *A45B 3/00* | (2006.01) |
| *A47D 13/04* | (2006.01) |
| *A63C 3/04* | (2006.01) |
| *B62B 5/06* | (2006.01) |
| *A63B 22/00* | (2006.01) |
| *A45B 5/00* | (2006.01) |
| *A61H 3/04* | (2006.01) |

(52) U.S. Cl.
CPC .. *B62B 5/06* (2013.01); *A61H 3/00* (2013.01); *A45B 3/00* (2013.01); *A47D 13/04* (2013.01); *B62D 39/00* (2013.01); *A63C 3/04* (2013.01); *A63B 22/00* (2013.01); *A45B 5/00* (2013.01); *A61H 3/04* (2013.01)
USPC ........................................ 280/33.992; 135/66

(58) Field of Classification Search
None
See application file for complete search history.

(56) References Cited

U.S. PATENT DOCUMENTS

| | | | | |
|---|---|---|---|---|
| 2,408,604 | A | * 10/1946 | Brickson | ............. 135/69 |
| RE24,817 | E | 4/1960 | Hogan | |
| 4,484,755 | A | 11/1984 | Houston | |
| 4,706,975 | A | * 11/1987 | Arena et al. | ....... 280/33.992 |
| 4,732,401 | A | 3/1988 | Siemon | |
| 7,743,779 | B2 | * 6/2010 | Gee, Sr. | ............. 135/67 |
| 2004/0020525 | A1 | * 2/2004 | Lev | ............. 135/66 |
| 2009/0152826 | A1 | 6/2009 | Silva et al. | |

FOREIGN PATENT DOCUMENTS

EP 2161178 A2 * 3/2010

* cited by examiner

*Primary Examiner* — Katy M Ebner
*Assistant Examiner* — Hilary L Johns
(74) *Attorney, Agent, or Firm* — Risso & Associates (57) ABSTRACT

Described is a shopping cart crutch assembly that is formed to allow a user to attach the shopping cart assembly with a variety of shopping carts. In doing so, a shopping cart handle brace can be positioned over a shopping cart handle. Rising from the shopping cart handle is the extension member which is used to elevate the body support member. A user can then position his/her armpits over the body support member and receive ambulatory support while being able to push and utilize the shopping cart.

14 Claims, 10 Drawing Sheets

SHOPPING CART CRUTCH ASSEMBLY

CROSS-REFERENCE TO RELATED APPLICATIONS

This is a non-provisional application of U.S. Provisional Application No. 61/836,786, filed on Jun. 19, 2013, and entitled, "Shopping Cart Crutch."

BACKGROUND OF THE INVENTION (1) Field of Invention

The present invention relates to a shopping cart accessory and more particularly, to a crutch assembly for selectively attaching with a shopping cart.

(2) Description of Related Art

Shopping carts have long been known in the art. Shopping carts are typically carts that are pushed around stores and/or aisles to allow a shopper to accumulate material prior to checking out of the store. As our population has aged, the number of people that are ambulatory yet may require some support while walking has increased dramatically. Such people are also, in many cases, self-reliant and would prefer to do their own shopping if possible.

As an aid to shopping, several grocery stores or other marts provide customers with motorized carts that can be driven around the store. The motorized carts allow mobile customers to visit and shop in the desired store. A problem with such carts however, is that are expensive, require constant charging, and are prone to breakage and costly repairs. Further, the motorized carts do not allow a shopper to "walk" around the store, which may be desired and, in some cases, provide therapeutic or necessary exercise to individuals.

Thus, a continuing need exists for a support system for a shopping cart to allow an individual to utilize the shopping cart while providing some ambulatory support to the user.

SUMMARY OF INVENTION

The present invention relates to a shopping cart accessory and, more particularly, to a crutch assembly for selectively attaching with a shopping cart. In one aspect, the shopping cart crutch assembly includes a cart attachment portion that is adapted to be attached with a shopping cart. A body support portion is attached with the cart attachment portion. The body support portion is adapted to be positioned against a user's armpit and at least partially support a user's weight when attached with the shopping cart.

In another aspect, the cart attachment portion includes a shopping cart handle brace with a cart body support protruding therefrom. The shopping cart handle brace is adapted to attach with a shopping cart handle and the cart body support is adapted to be connected with a shopping cart frame member.

In yet another aspect, the shopping cart handle brace is a U-shaped bracket that is formed to be attached with a shopping cart handle.

In another aspect, the cart body support includes a plurality of receptacles, each adapted to connect with a shopping cart frame member.

In yet another aspect, an extension member is connected with and between the cart attachment portion and the body support portion. Additionally, the extension member is attached with the U-shaped bracket.

In another aspect, an adjuster is included that is adapted to allow a user to selectively alter a height of the body support portion.

In another aspect, the adjuster is a riser adapted to be attached with and between the extension member and the body support portion.

In yet another aspect, the body support portion includes a support arm and a cushion positioned around the support arm.

Finally, as can be appreciated by one in the art, the present invention also comprises a method for forming and using the invention described herein.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

The present invention relates to a shopping cart accessory and, more particularly, to a crutch assembly for selectively attaching with a shopping cart. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is only one example of a generic series of equivalent or similar features. It should be understood that all of the components described herein can be formed of any suitable material (e.g., metal, plastic, etc.) and that the various examples and aspects described herein can be switched, swapped, and otherwise combined with one another in any desired combination.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object.

(1) Description

Figure 1:
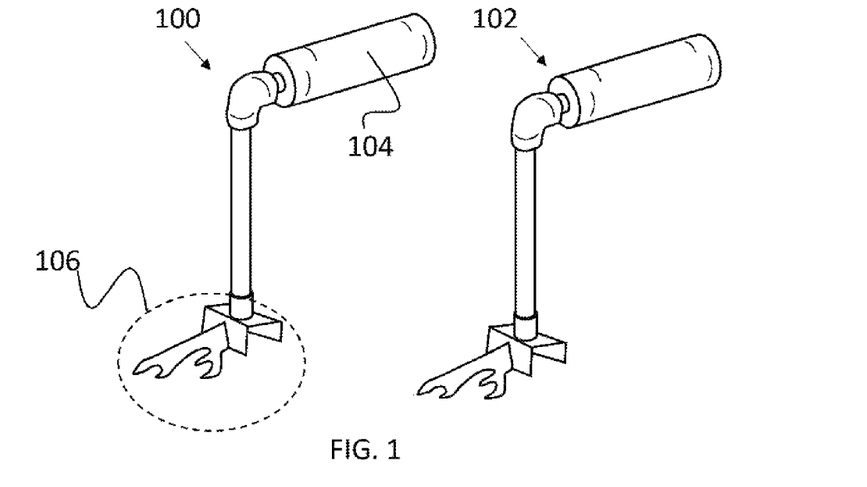
FIG. 1 is an illustration of a pair of crutch assemblies according to the principles of the present invention.
Figure 2:
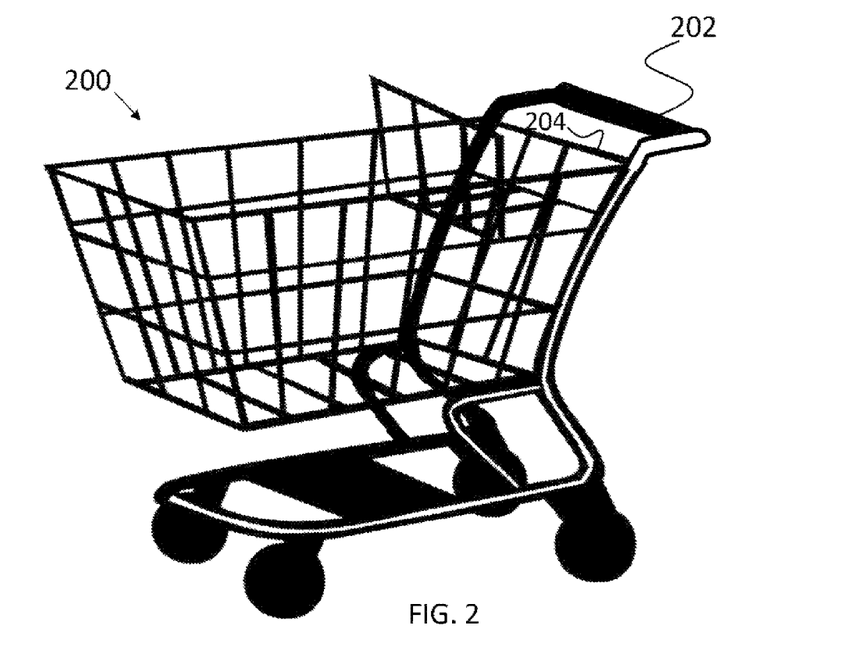
FIG. 2 is an illustration of a typical shopping cart for use with the crutch assemblies of the present invention.
Figure 3:
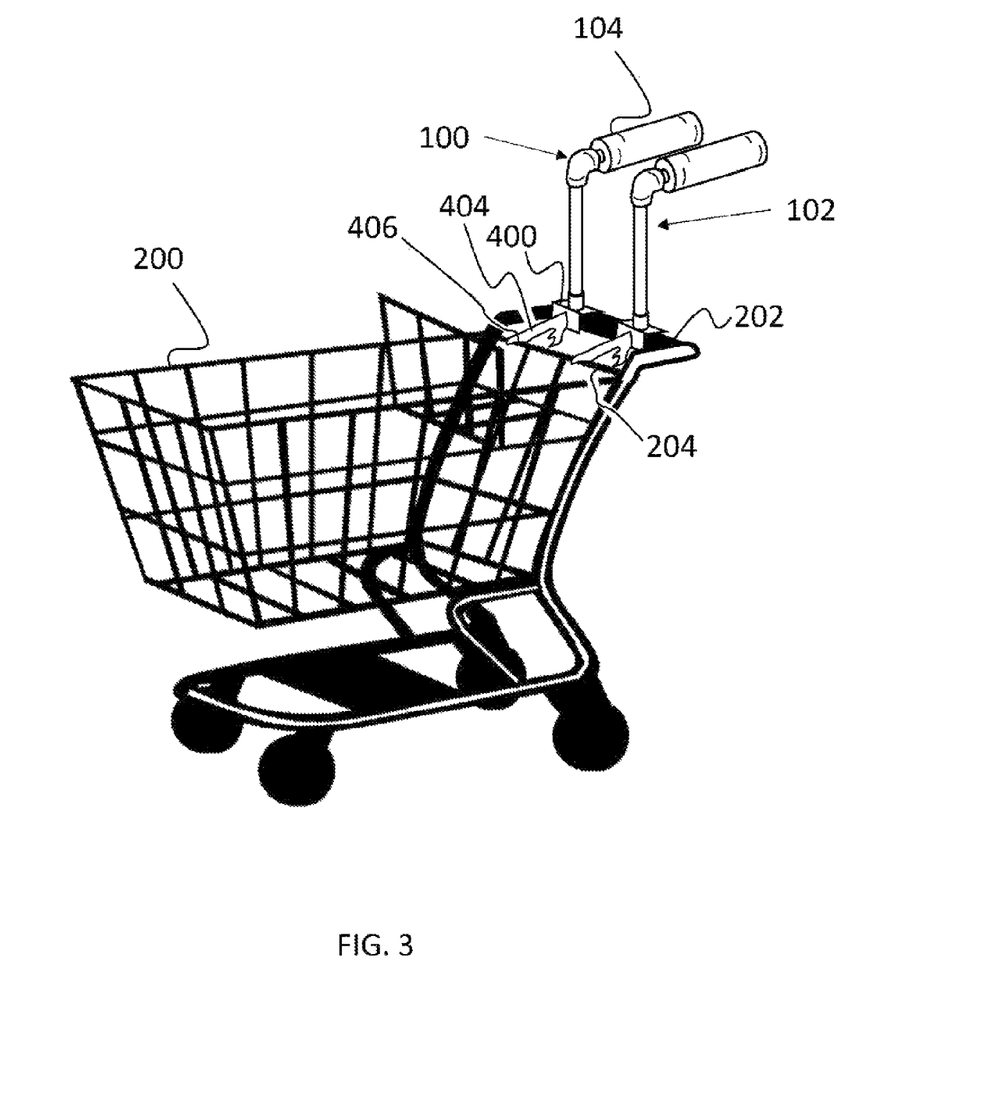
FIG. 3 is an illustration depicting the crutch assemblies as affixed with the shopping cart according to the principles of the present invention.

The present invention is directed to a crutch assembly (or assemblies) for attaching with a shopping cart. For example, FIG. 1 provides an illustration of a first shopping cart crutch assembly 100 and a second shopping cart crutch assembly 102 (collectively a pair of crutch assemblies). Each crutch assembly 100 and 102 includes a body support portion 104 that is connected with a cart attachment portion 106. Via the cart attachment portion 106, the crutch assemblies 100 and 102 are formed to be attached with a shopping cart (an example of which is shown as element 200 in FIG. 2) and provide an armpit crutch support for a user. Thus, as shown in FIG. 3, once attached with a shopping cart 200, the crutch assemblies 100 and 102 provide ambulatory support for a user. More specifically, when the crutch assemblies 100 and 102 are attached with the shopping cart 200, a user can stand between the crutch assemblies 100 and 102 and position his/her arms over the body support portions 104 with the user's armpits resting upon the body support portions 104 (similar to a standard armpit supporting crutch). When the user's arms are positioned over the body support portions 104, the user can rest his/her weight upon the body support portions 104 to support a portion of the user's weight. An advantage of this configuration is that it allows the user to walk and use the shopping cart 200 while being partially supported by the crutch assemblies 104.

As can be appreciated by those skilled in the art, there are many mechanisms and techniques by which crutch assemblies can be affixed with a shopping cart 200 to provide for ambulatory support. Thus, the present invention is directed to a crutch assembly 100 and 102 that includes at least a body support portion 104 that is adapted to be positioned under a user's armpits, with the body support portion 104 being connected with a cart attachment portion 106. Described below and illustrated throughout FIGS. 1 through 11 are several non-limiting examples of suitable crutch assemblies according to the principles of the present invention.

Figure 4:
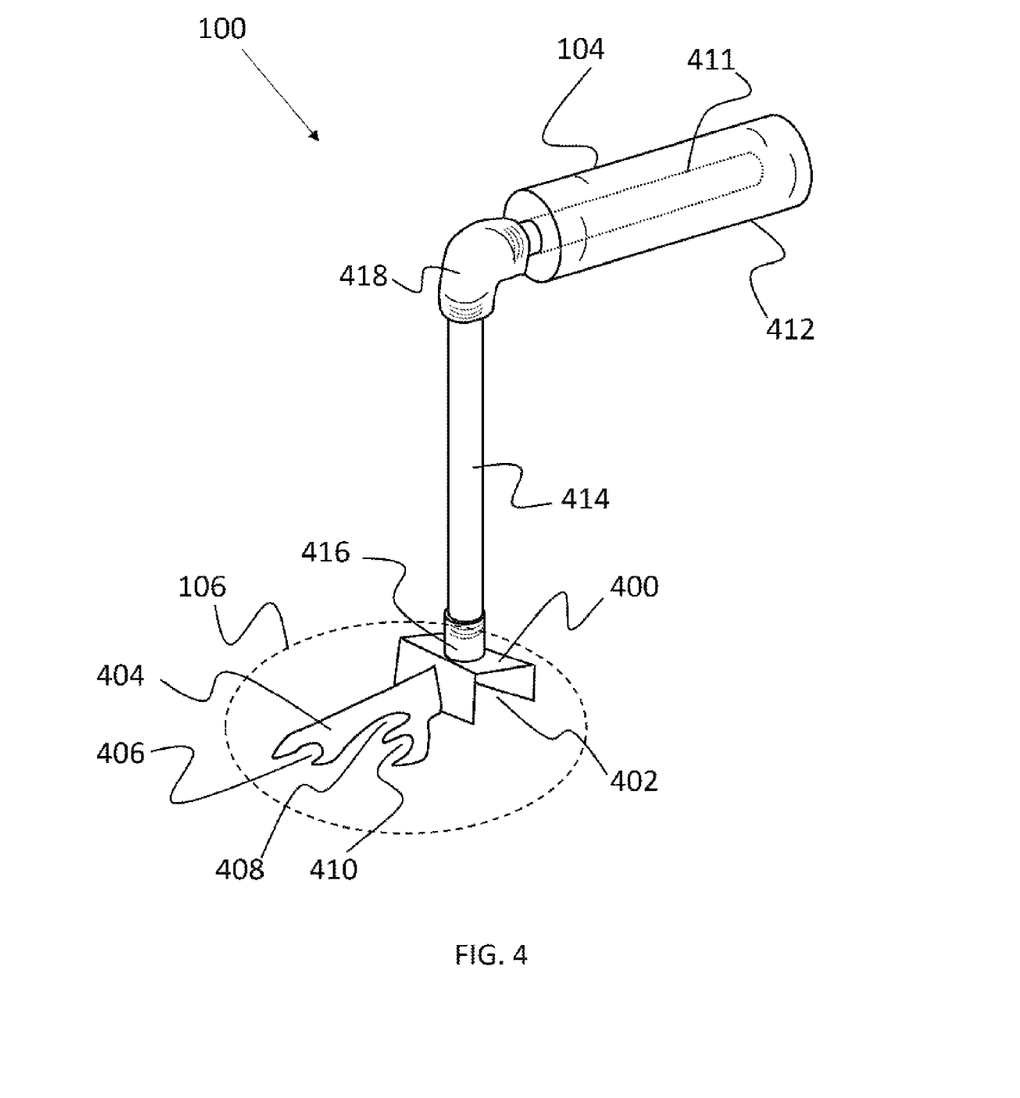
FIG. 4 is an illustration of a crutch assembly according to the principles of the present invention.

For example, FIG. 4 depicts a crutch assembly 100 according to the principles of the present invention. The cart attachment portion 106 is any suitable mechanism or device that allows for the crutch assembly 100 to be attached with a shopping cart. In one aspect, the cart attachment portion 106 can be bolted or fixedly attached with the shopping cart. In another aspect, the cart attachment portion 106 is formed to allow a user to easily and selectively attach and detach the crutch assembly 100 to and from a shopping cart. As a non-limiting example, the cart attachment portion 106 includes a shopping cart handle brace 400 that is formed in any suitable manner such that it can be attached with a shopping cart handle (depicted as element 202 in FIG. 2). For example, the shopping cart handle brace 400 includes a bottom portion with a channel 402 formed therein. The channel 402 is formed to receive and securely attach with the shopping cart handle. As a non-limiting example of such a configuration, the shopping cart handle brace 400 is a U-shaped bracket that is sized to easily slip over and snugly rest upon a traditional grocery cart handle. As a non-limiting example, the U-shaped bracket is 1.5 inches wide and 1.5 inches tall, with a length of 4.0 inches. Although the term U-shape is used, it should be understood that the corners can also be formed at 90 degree angles (as depicted), instead of being rounded out as the letter "U" may imply.

Protruding from the shopping cart handle brace 400 is a cart body support 404. The cart body support 404 is any suitable mechanism or device that is adapted to be connected with a shopping cart frame member (an example of which is depicted as element 204 in FIG. 2). As a non-limiting example, the cart body support 404 is a metal plate (or rod, pipe, protrusion, etc.) that is welded, bolted, or otherwise affixed to the shopping cart handle brace 400. As shown in FIG. 3, the metal plate (i.e., the cart body support 404) is of sufficient length to engage with shopping cart frame member 204 when the shopping cart handle brace 400 is attached with the shopping cart handle 202.

Figure 9:
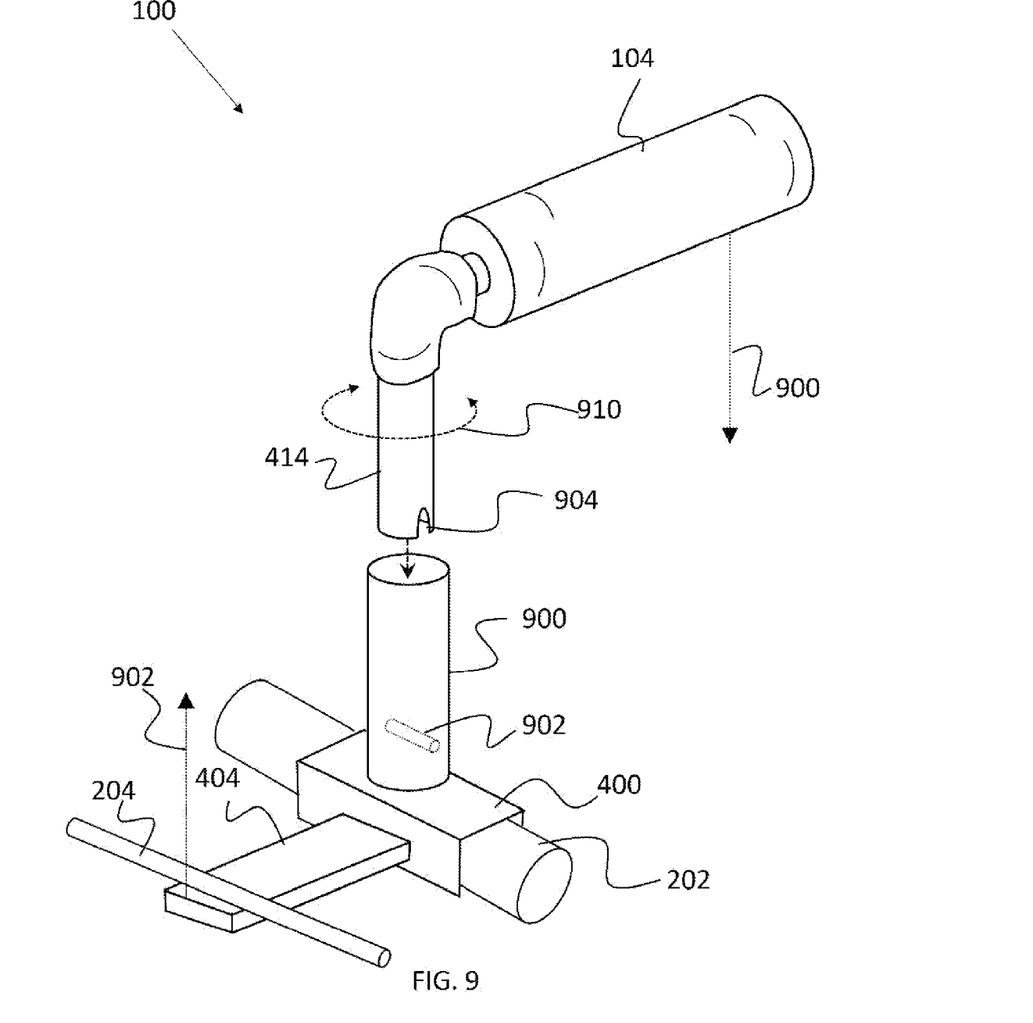
FIG. 9 is an illustration of a crutch assembly according to the principles of the present invention.

In one aspect and as shown in FIG. 9, the cart body support 404 can be a simple plate or rod that protrudes from the shopping cart handle brace 400. In this aspect, the cart body support 404 would then be positioned below the shopping cart frame member 204 when the shopping cart handle brace 400 is attached with the shopping cart handle 202. This configuration (along with the configurations described below) provides for a very stable support and attachment when a user's weight is positioned upon the body support portion 104. In other words, as the user's weight is positioned upon the body support portion 104, the body support portion 104 is pushed downwards 900, which results in the cart body support 404 being forced upwards 902 and tightly against the shopping cart frame member 204.

Alternatively and referring again to FIG. 4, the cart body support 404 can be formed with any desired number of receptacles for receiving or otherwise affixing with a shopping cart frame member 204. As a non-limiting example and as shown in FIG. 4, the cart body support 404 includes three receptacles 406, 408, and 410 that are formed as recesses, cut-outs, or grooves. Each of the receptacles is formed or adapted to receive a shopping cart frame member 204. For example and as shown in FIG. 3, the first receptacle 406 is partially positioned around the shopping cart frame member 204 to securely affix the cart assembly 100 with the shopping cart 200.

It should be understood that not all shopping carts are the same. In other words, the distance and elevation between the shopping cart handle 202 and the shopping cart frame member 204 can be different depending on the make of the shopping cart. To accommodate shopping carts of different sizes, the cart body support 404 can be formed to include a plurality of receptacles (e.g., 406, 408, and 410) that are positioned at different locations, elevations, and/or depths on the cart body support 404. Thus, the specific receptacle (e.g., 404, 408, and 410) that is used to affix with the shopping cart frame member 204 will depend on the dimensions of the particular shopping cart 200 upon with the crutch assembly 100 is attached.

Figure 5:
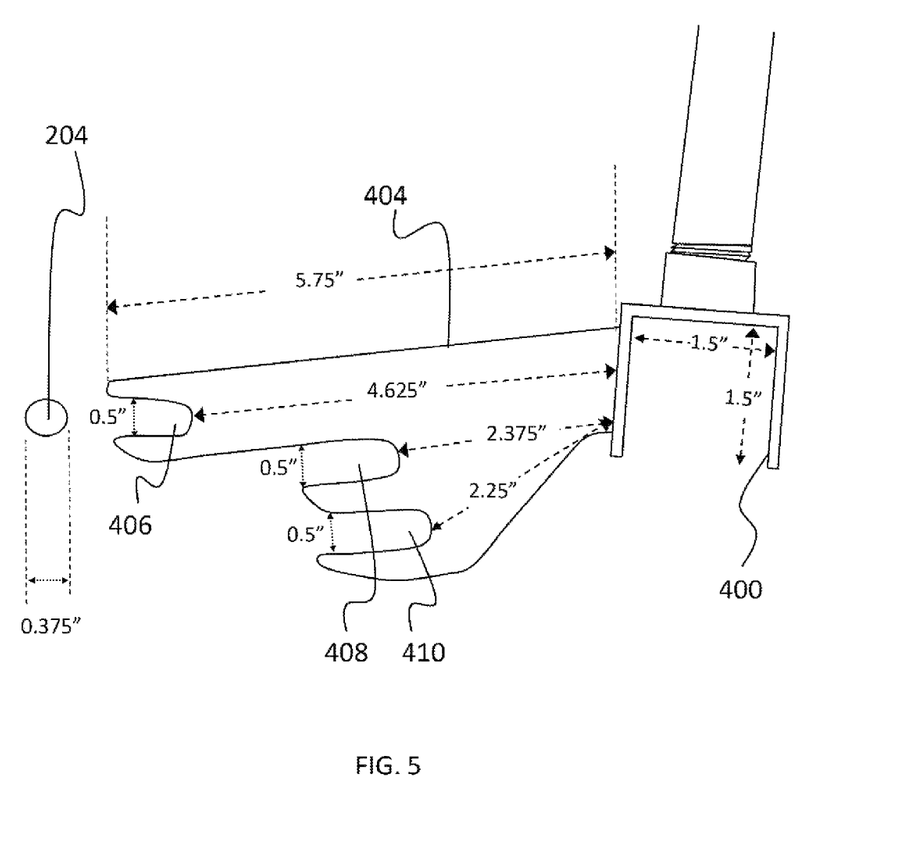
FIG. 5 is an illustration of a cart attachment portion according to the principles of the present invention.

For further understanding, FIG. 5 is a side-view illustration of a cart attachment portion 106 according to the principles of the present invention. In this non-limiting example, the cart body support 404 is a plate that is attached to the shopping cart handle brace 400. As shown, the cart body support 404 includes three receptacles 406, 408, and 410 that are formed at different distances and elevations from the shopping cart handle brace 400. Importantly, each receptacle 406, 408, and 410 is formed to accommodate the size and shape of the shopping cart frame member 204 (i.e., a cross-sectional view of the shopping cart frame member 204 is depicted). Thus, in this example, when attaching the crutch assembly with a shopping cart, the user can position one of the receptacles (e.g., 406, 408, 410) around the shopping cart frame member 204 and then pivot the shopping cart handle brace 400 downward until it securely rests upon the shopping cart handle. It should be understood that the dimensions as depicted in FIG. 5 are provided as a non-limiting example of a cart body support 404 and that other dimensions and configurations are within the scope and envisioned by the present invention.

Figure 7:
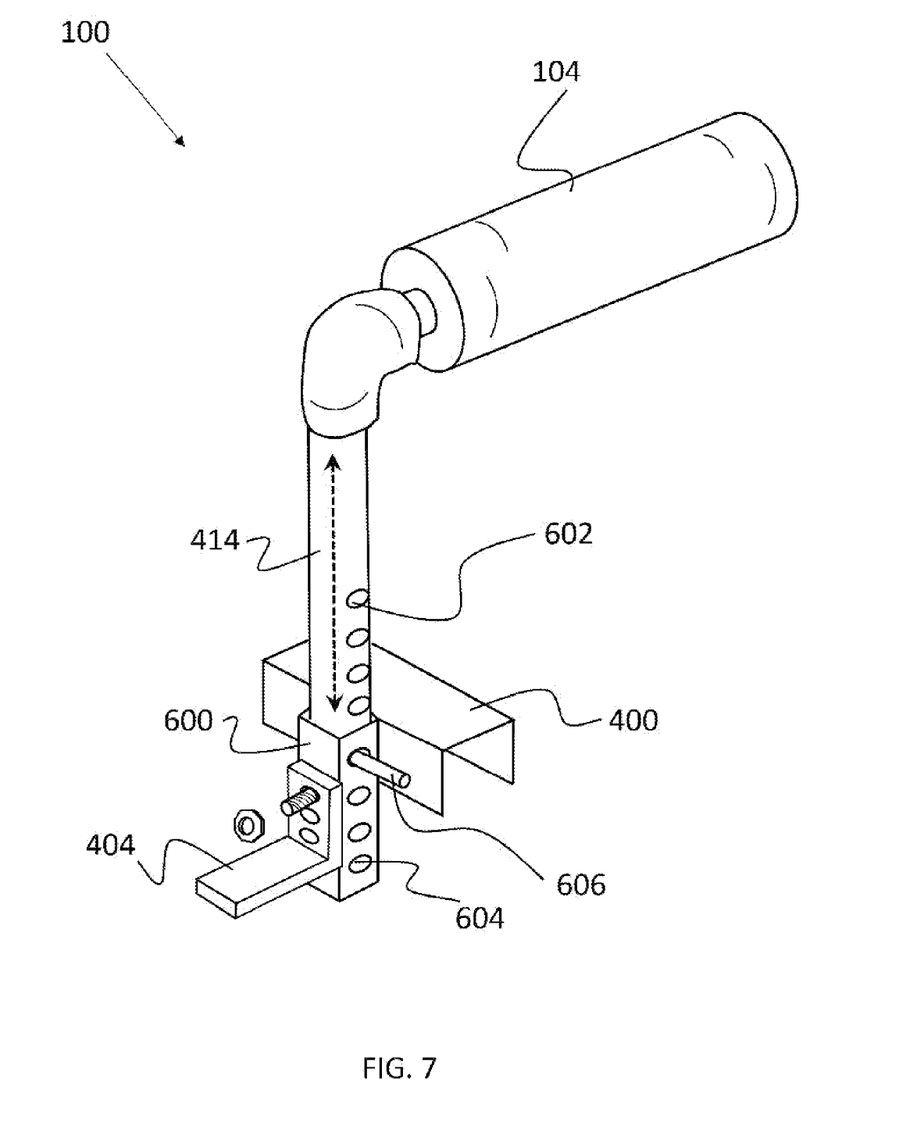
FIG. 7 is an illustration of a crutch assembly according to the principles of the present invention.
Figure 8:
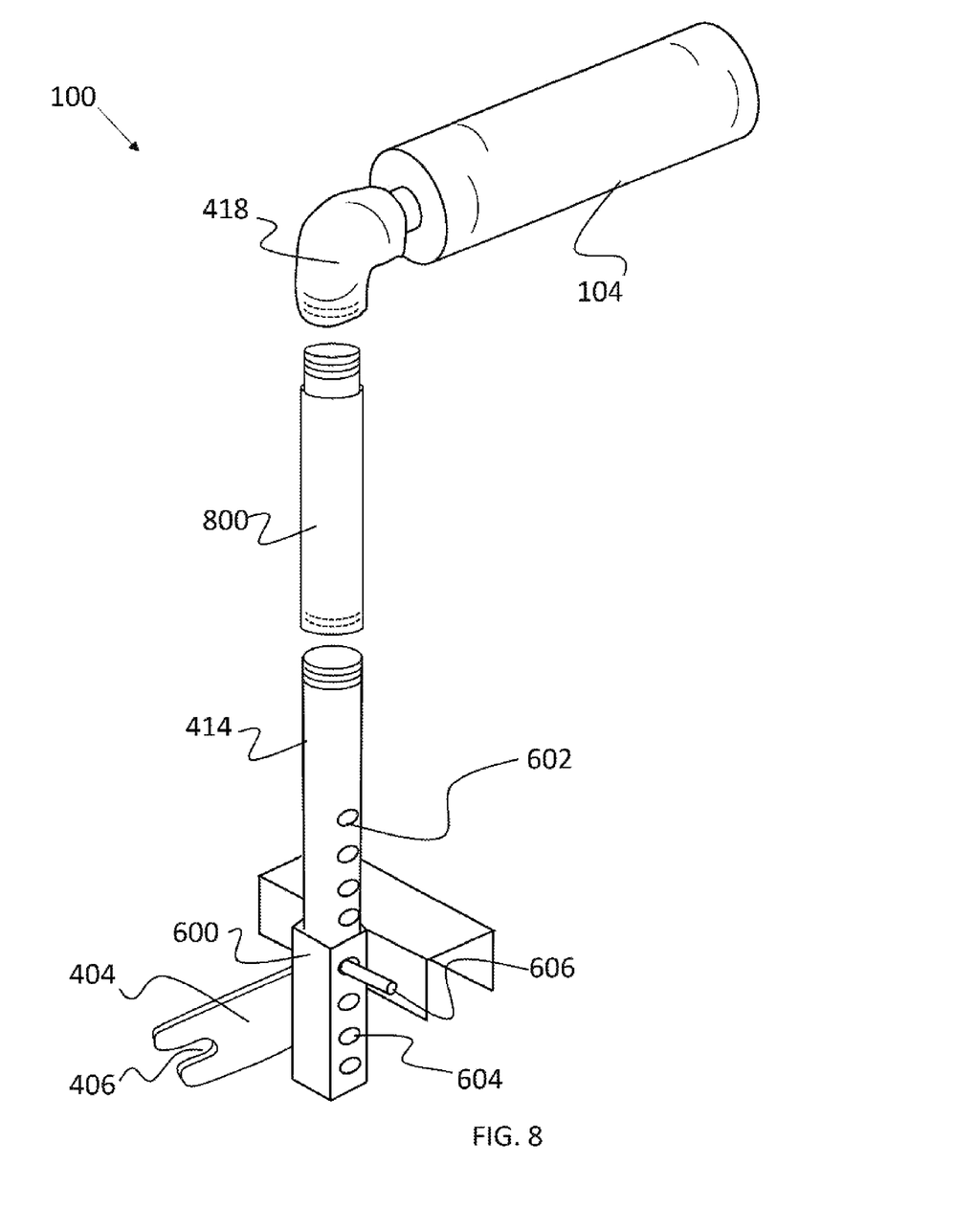
FIG. 8 is an illustration of a crutch assembly according to the principles of the present invention.
Figure 10:
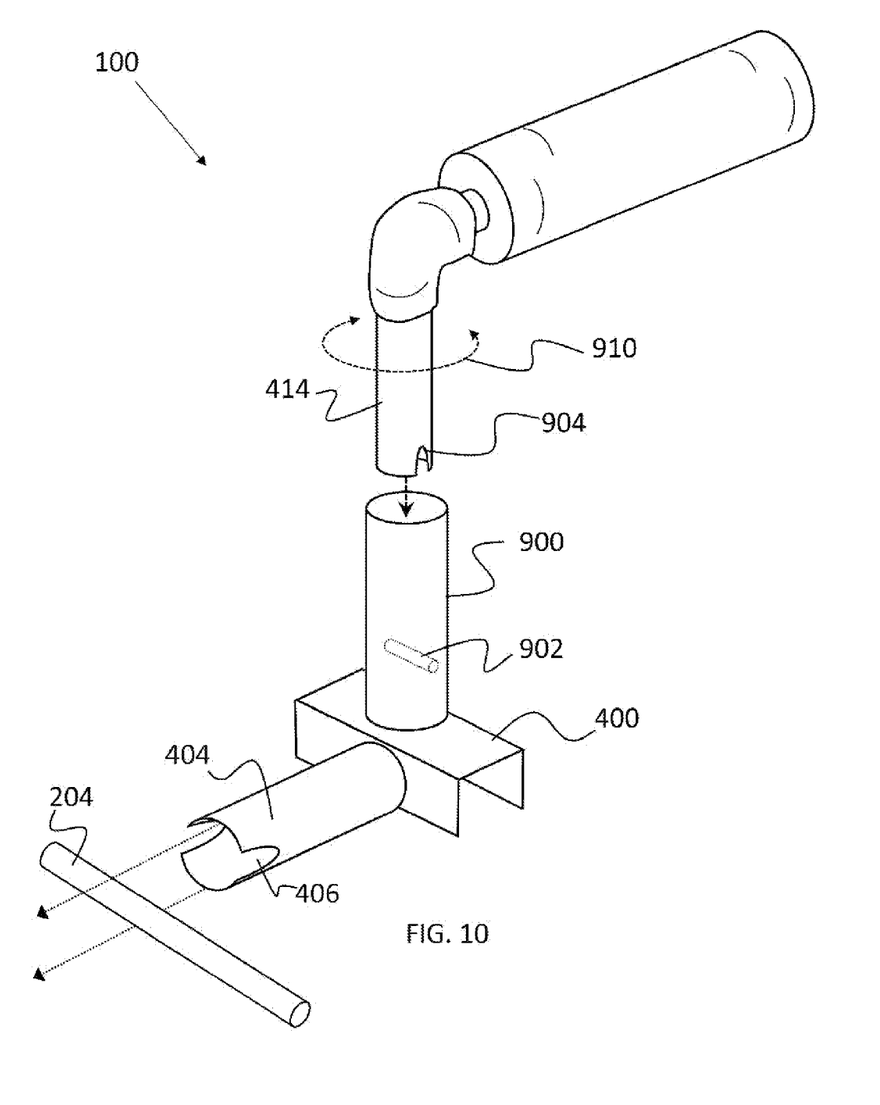
FIG. 10 is an illustration of a crutch assembly according to the principles of the present invention.
Figure 11:
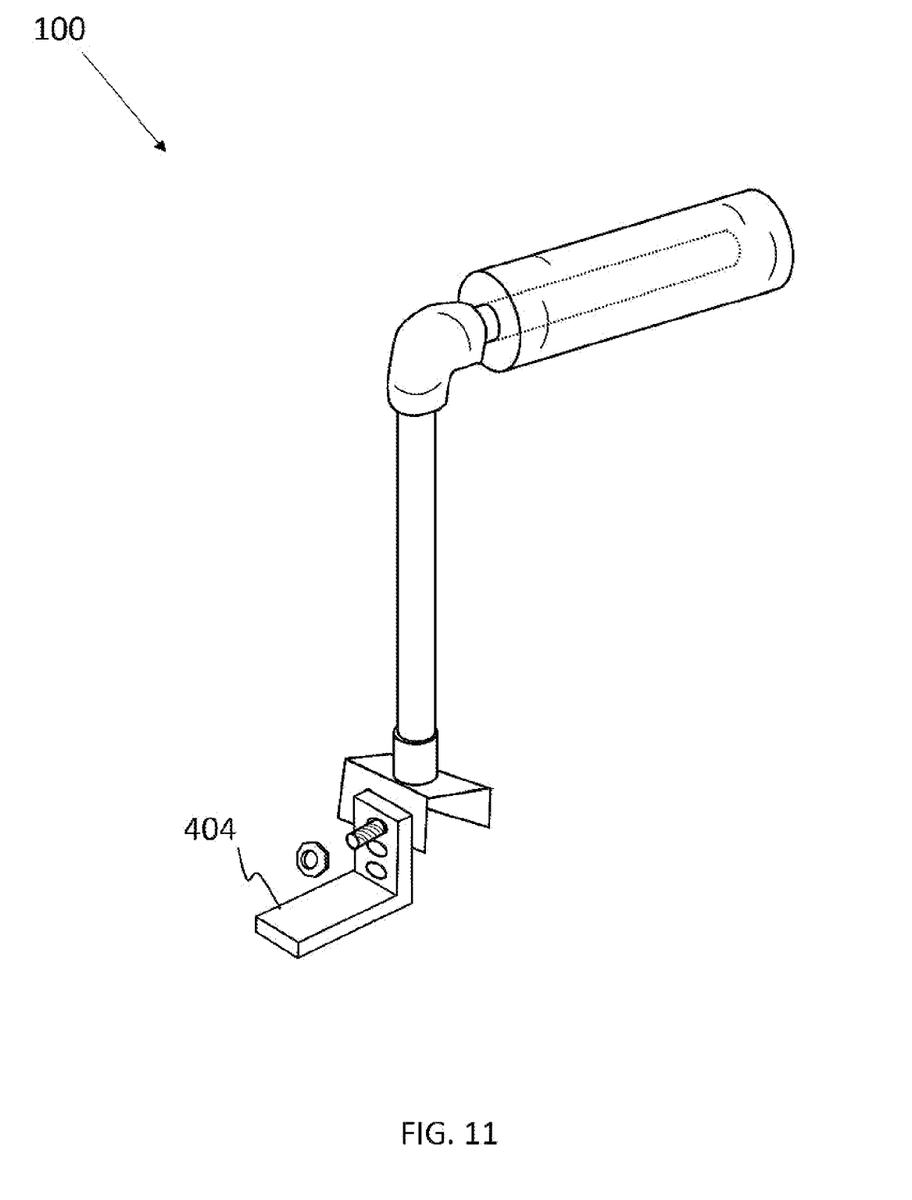
FIG. 11 is an illustration of a crutch assembly according to the principles of the present invention.

As noted above, the cart body support 404 is any suitable mechanism or device that allows the crutch assembly to securely attach with the frame or body of a shopping cart. Several additional non-limiting examples of cart body support 404 configurations are illustrated in FIGS. 7 through 11. FIGS. 7 and 11, for example, depict the cart body support 404 as an L-shaped bracket that is bolted against the rest of the crutch assembly 100. FIG. 8 illustrates the cart body support 404 as welded against an adjuster (e.g., sleeve 600 with markings 604) and having a single receptacle 406 (to be contrasted with the multiple receptacles as described above). As noted above, FIG. 9 illustrates the cart body support 404 as a simple plate that is attached (e.g., via welding, etc.) to the shopping cart handle brace 400. Finally, FIG. 10 illustrates the cart body support 404 as a pipe with notches cut out at the end of the pipe to serve as the receptacle 406 for receiving the shopping cart frame member 204.

Referring again to FIG. 4, the crutch assembly 100 includes a body support portion 104. The body support portion 104 is formed in any shape, configuration, or manner to allow a user to position a portion of their weight upon the body support portion 104. As a non-limiting example, the body support portion 104 is formed to be positioned against a user's armpit, similar to a traditional walking crutch that provides ambulatory support. In this aspect and as yet another non-limiting example, the body support portion 104 includes a support arm 411 (e.g., metal threaded pipe, rod, etc.) with a cushion 412 attached thereto.

To increase user comfort, the cushion 412 is attached with the support arm 411 to soften or cushion the impact of the support arm 411 against the user's armpit. The cushion 412 is any suitable mechanism or device that provides for cushioning, a non-limiting example of which includes a foam cylindrical cushion. In this aspect, the support arm 411 can simply be slid into the foam cylindrical cushion to affix it thereto.

Additionally, an extension member 414 is connected with and between the shopping cart handle brace 400 and the body support portion 104. Thus, in this example, the extension member 414 rises from the shopping cart handle brace 400 and is securely attached with the support arm 411. The extension member 414 can be attached with and between the shopping cart handle brace 400 and the body support portion 104 using any mechanism, technique, or device. In one example, the extension member 414, body support portion 104, and shopping cart handle brace 400 are integrally formed as a single item (e.g., molded, extruded and bent into the desired shape, etc.)

As another non-limiting example, each of the components are separately formed and attached to one another (such as being welded, bolted, etc). As yet another non-limiting example of this aspect, a threaded socket 416 is welded to the shopping cart handle brace 400. In this aspect, the extension member 414 can be a metal pipe with threads at both ends. Thus, the extension member 414 can simply be screwed into the threaded socket 416. Further, a metal threaded elbow 418 can be used to affix the support arm 411 with the extension member 414. Thus, the support arm 411 can simply be screwed into the elbow 418, which in turn is screwed onto the extension member 414, thereby securely affixing the support arm 411 with the shopping cart handle brace 400.

Figure 6:
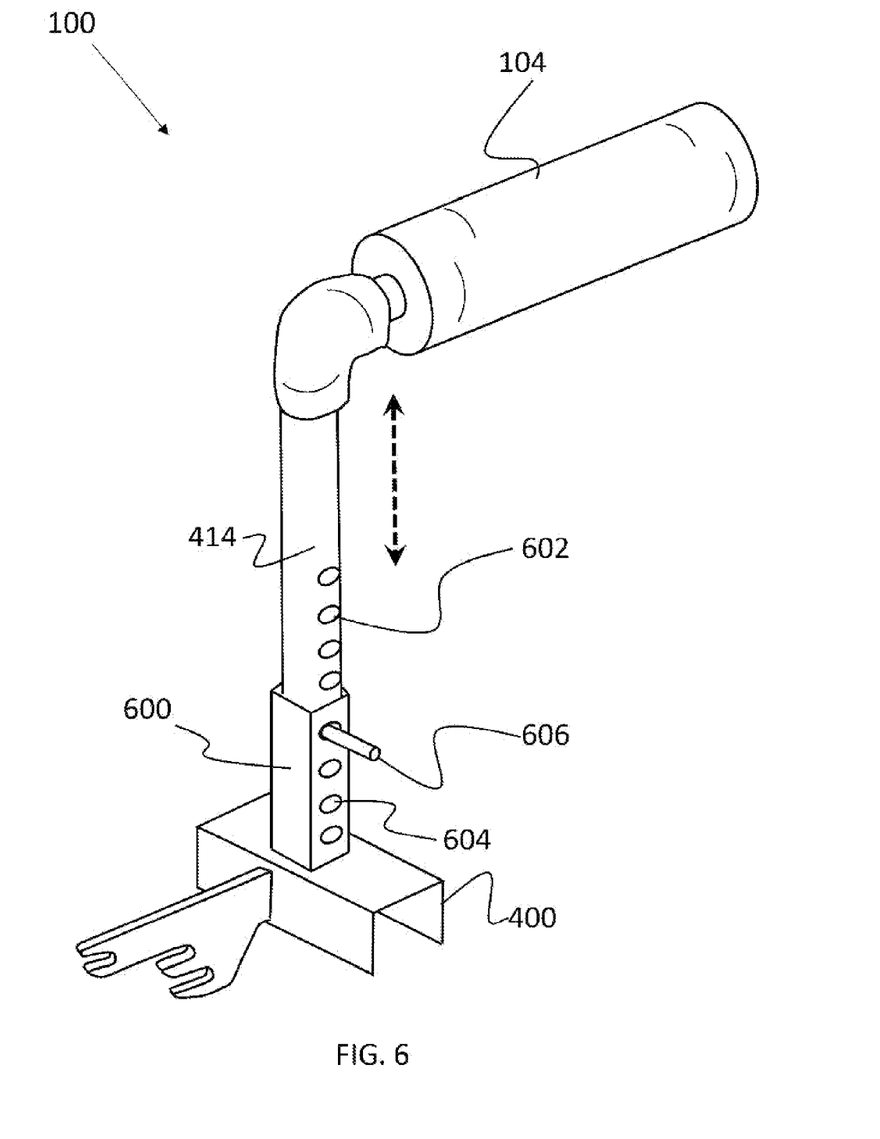
FIG. 6 is an illustration of a crutch assembly according to the principles of the present invention.

Additional non-limiting example of connection techniques are depicted in FIGS. 6 through 10. For example, FIGS. 6, 7, and 8 illustrate variations of adjuster sleeves 600 that can be affixed (welded, bolted, etc.) with the shopping cart handle brace 400. In this aspect, the extension member 414 is simply slid or positioned within the adjuster sleeve 600. The extension member 414 can be formed with a series of markings 602 (e.g., holes). Similarly, the sleeve 600 can be formed with a corresponding series of markings 604. A connector 606 can be used to allow a user to selectively affix the extension member 414 against the sleeve 600. For example, the connector 606 can be a pin, bolt, wing nut, etc., that can be positioned through the markings 602 and 604.

Another non-limiting example of a connection technique is depicted in FIGS. 9 and 10. In this example, a sleeve 900 is affixed (e.g., welded, etc.) with the shopping cart handle brace 400. The extension member 414 is formed to slide within the sleeve 900 and, thereby, affix the support member 104 with the shopping cart handle brace 400. To prevent lateral rotation 910 of the support member 104, the crutch assembly 100 includes a rotation inhibitor. The rotation inhibitor is any suitable mechanism or device that prevents lateral rotation 910 of the body support portion 104. As a non-limiting example, within the sleeve 900 is a pin 902. The pin 902 can be affixed with the sleeve 900 using any suitable mechanism or technique. As a non-limiting example, the pin 902 is press fit through a hole that can be formed in the side of the sleeve 900. Further, in this non-limiting example, the extension member 414 includes a recess 904 or depression cut-out at the end the extension member 414. The recess 904 is formed to matingly engage with the pin 902. Thus, when the extension member 414 is slid into the sleeve 900, the pin 902 rests within the recess 904, thereby preventing lateral rotation 910 of the body support portion 104.

Also as shown in the figures the distance between the shopping cart handle brace 400 and the body support portion 104 can be adjusted or selectively varied, which adjusts the vertical height of the body support portion 104. The adjustability allows the crutch assembly 100 to be utilized by people of different heights. As can be appreciated, a woman that is five feet tall would have a desired armpit height that is dramatically different than that of a six foot tall man. Thus, the present invention can be formed to provide for adjustability of the height of the body support portion 104.

For example and as referenced above and shown in FIGS. 6, 7, and 8, the present invention also includes an adjuster that is adapted to adjust a vertical height of the body support portion 104. Thus, the adjuster is any suitable mechanism or device or configuration that allows for selective adjustment of the vertical height of the body support portion 104. While the adjuster can be a separate component (such as a connector 606 or riser 800 described below), it can also be integrally formed as part of any of the other components (such as the series of markings 602 and 604).

In one aspect and as a non-limiting example, the adjuster is the connector 606 that is used to allow a user to select and affix a vertical position of the extension member 414 with respect to the sleeve 600 (using the series of markings 602 and 604). Thus, by selectively affixing the vertical position of the extension member 414 with respect to the sleeve 600, a user is able to adjust the height of the body support portion 104.

As another example and as illustrated in FIG. 8, a riser 800 can be included. In this aspect, the riser 800 is a threaded rod that simply provides an extension to the extension member 414. For example, the extension member 414 can be threaded into the riser 800, with the riser 800 being threaded into the elbow 418. The invention can include multiple risers 800 or risers 800 of different heights to allow for selective adjustment of the height of the body support portion 104.

Thus, as described above, the present invention is directed to a shopping cart crutch assembly 100 that is formed to allow a user to attach the shopping cart assembly 100 with a variety of shopping carts 200. In doing so, a shopping cart handle brace 400 can be positioned over a shopping cart handle 202. Rising from the shopping cart handle brace 404 is the extension member 414 which is used to elevate the body support member 104. A user can then position his/her armpits over the body support member 104 and receive ambulatory support while being able to push and utilize the shopping cart 200.

What is claimed is:

1. A shopping cart crutch assembly, comprising:
   a cart attachment portion, the cart attachment portion formed to be attached with a shopping cart that includes a shopping cart handle and shopping cart frame member, with a gap between the shopping cart handle and the shopping cart frame member, wherein the cart attachment portion includes a shopping cart handle brace with a cart body support protruding therefrom, the shopping cart handle brace is formed to attach with the shopping cart handle, such that when the shopping cart handle brace is attached with the shopping cart handle, the cart body support spans the gap between the shopping cart handle and the shopping cart frame member and provides a locking engaging with the shopping cart such that the cart body support is positioned securely against the shopping cart frame member; and
   a body support portion attached with the cart attachment portion, the body support portion adapted to be positioned against a user's armpit and at least partially support a user's weight when attached with the shopping cart.

2. The shopping cart crutch assembly as set forth in claim 1, wherein the shopping cart handle brace is a U-shaped bracket that is formed to be attached with a shopping cart handle.

3. The shopping cart crutch assembly as set forth in claim 2, wherein the cart body support includes a plurality of receptacles, each adapted to connect with a shopping cart frame member.

4. The shopping cart crutch assembly as set forth in claim 3, further comprising an extension member connected with and between the cart attachment portion and the body support portion.

5. The shopping cart crutch assembly as set forth in claim 4, wherein the extension member is attached with the U-shaped bracket.

6. The shopping cart crutch assembly as set forth in claim 5, further comprising an adjuster adapted to allow a user to selectively alter a height of the body support portion.

7. The shopping cart crutch assembly as set forth in claim 6, wherein the adjuster is a riser adapted to be attached with and between the extension member and the body support portion.

8. The shopping cart crutch assembly as set forth in claim 7, wherein the body support portion includes a support arm and a cushion positioned around the support arm.

9. The shopping cart crutch assembly as set forth in claim 1, further comprising an extension member connected with and between the cart attachment portion and the body support portion.

10. The shopping cart crutch assembly as set forth in claim 1, further comprising an adjuster adapted to allow a user to selectively alter a height of the body support portion.

11. The shopping cart crutch assembly as set forth in claim 10, wherein the adjuster is a riser adapted to be attached with and between the extension member and the body support portion.

12. The shopping cart crutch assembly as set forth in claim 1, wherein the cart body support includes a plurality of receptacles, each adapted to connect with a shopping cart frame member.

13. The shopping cart crutch assembly as set forth in claim 1, wherein the body support portion includes a support arm and a cushion positioned around the support arm.

14. A shopping cart crutch assembly set, comprising:
   a. a first shopping cart crutch assembly, the first shopping cart crutch assembly having:
      a cart attachment portion, the cart attachment portion formed to be attached with a shopping cart that includes a shopping cart handle and shopping cart frame member, with a gap between the shopping cart handle and the shopping cart frame member, wherein the cart attachment portion includes a shopping cart handle brace with a cart body support protruding therefrom, the shopping cart handle brace is formed to attach with the shopping cart handle, such that when the shopping cart handle brace is attached with the shopping cart handle, the cart body support spans the gap between the shopping cart handle and the shopping cart frame member and provides a locking engaging with the shopping cart such that the cart body support is positioned securely against the shopping cart frame member; and
      a body support portion attached with the cart attachment portion, the body support portion adapted to be positioned against a user's armpit and at least partially support a user's weight when attached with the shopping cart;
   b. a second shopping cart crutch assembly, the second shopping cart crutch assembly having:
      a cart attachment portion, the cart attachment portion formed to be attached with the shopping cart, wherein the cart attachment portion includes a shopping cart handle brace with a cart body support protruding therefrom, the shopping cart handle brace is formed to attach with the shopping cart handle, such that when the shopping cart handle brace is attached with the shopping cart handle, the cart body support spans the gap between the shopping cart handle and the shopping cart frame member and provides a locking engaging with the shopping cart such that the cart body support is positioned securely against the shopping cart frame member; and a body support portion attached with the cart attachment portion, the body support portion adapted to be positioned against the user's armpit and at least partially support the user's weight when attached with the shopping cart.

\* \* \* \* \*